(12) United States Patent
Peyton

(10) Patent No.: US 7,343,296 B2
(45) Date of Patent: Mar. 11, 2008

(54) PUPPETRY BASED COMMUNICATION SYSTEM, METHOD AND INTERNET UTILITY

(75) Inventor: Jeffrey L. Peyton, Richmond, VA (US)

(73) Assignee: Puppetools, Inc., Richmond, VA (US)

( * ) Notice: Subject to any disclaimer, the term of this patent is extended or adjusted under 35 U.S.C. 154(b) by 0 days.

(21) Appl. No.: 09/808,650

(22) Filed: Mar. 14, 2001

(65) Prior Publication Data

US 2007/0219809 A1    Sep. 20, 2007

(51) Int. Cl.
*G06Q 99/00* (2006.01)
(52) U.S. Cl. ....................................................... 705/1
(58) Field of Classification Search ...................... 705/1
See application file for complete search history.

(56) References Cited

U.S. PATENT DOCUMENTS

| | | | |
|---|---|---|---|
| 4,555,236 A | 11/1985 | Peyton | 446/329 |
| 4,869,702 A | 9/1989 | Derby, III | 446/329 |
| 4,880,404 A | 11/1989 | Derby, III | 446/329 |
| 5,009,626 A * | 4/1991 | Katz | 446/329 |
| 5,577,186 A * | 11/1996 | Mann et al. | 715/500.1 |
| 5,893,717 A | 4/1999 | Kirsch et al. | 434/118 |
| 5,906,005 A * | 5/1999 | Niskala et al. | 446/391 |
| 5,957,699 A | 9/1999 | Peterson et al. | 434/350 |
| 5,974,446 A | 10/1999 | Sonnenreich et al. | 709/204 |
| 5,978,648 A | 11/1999 | George et al. | 434/362 |
| 5,987,443 A | 11/1999 | Nichols et al. | 706/11 |
| 6,014,134 A * | 1/2000 | Bell et al. | 345/705 |
| 6,018,768 A | 1/2000 | Ullman et al. | 709/218 |
| 6,067,537 A | 5/2000 | O'Connor et al. | 706/47 |
| 6,514,079 B1 * | 2/2003 | McMenimen et al. | 434/219 |
| 2002/0168616 A1 * | 11/2002 | Chan et al. | 434/118 |

FOREIGN PATENT DOCUMENTS

JP           07068059 A    *   3/1995

OTHER PUBLICATIONS www.paperfolding.com, Nov. 19, 1999.*

(Continued)

*Primary Examiner*—Jonathan Ouellette
(74) *Attorney, Agent, or Firm*—Morgan Lewis & Bockius

(57) ABSTRACT

A puppetry based system and method is provided. Specifically, the puppetry based system and method comprises a computer environment including one or more images, symbols and other proprietary content (collectively referred to as "images"). A printer is connected to the computer environment for printing the images in paper form. A hinge is provide which is attached to the paper form. The hinge is adapted for hand manipulation to create a hand actuated puppet which is representative of the image. In another aspect of the present invention, a puppetry based business model system and method is provided wherein content providers and owners provide images, to a puppet site. The puppet site reconfigures the images, symbols and other proprietary content to include a hinge area which, when such images are downloaded in paper form, the hinge area is adapted to be hand manipulated to form the paper form into a hand actuated puppet representation of the image. Users, such as children, teachers and parents, subscribe to the puppet site and download selected images in paper form. The paper forms are formed into hand actuated puppets representative of the images and are used for communication, play, entertainment and learning. Further, the puppet site may include a training laboratory equipped with multimedia audio and video to provide demonstrations and modeling of skills and techniques associated with puppet-based learning and communication.

16 Claims, 11 Drawing Sheets

OTHER PUBLICATIONS www.enchantedlearning.com, Mar. 1, 2000.*
www.origami-usa.org, Mar. 3, 2000.*
www.legendsandlore.com.*
www.puppetools.com, retrieved from Internet Archive Wayback Machine <www.archive.org>, date range: Dec. 22, 1997-Mar. 1, 2000.*

Spann, Mary Beth, "Make peace-keeping playful." Instructor, v103, n7, p24(2), Mar. 1994.* www.puppetools.com, scientific explanation of concept, Retrieved from Internet Wayback Machine <www.archive.org>, Date Range: Feb. 3, 1999-Apr. 28, 1999.*

* cited by examiner

PUPPETRY BASED COMMUNICATION SYSTEM, METHOD AND INTERNET UTILITY

FIELD OF THE INVENTION

This invention relates generally to the field of teaching and education and more particularly relates to a system and method of communication using puppetry based interactive media.

BACKGROUND OF THE INVENTION

Play energy in its strongest and expressive forms is usually missing, diluted or found randomly in most learning environments, yet it is deemed important and crucial as a basis for learning. It is even more absent from computers where users, in order to benefit, are locked into tightly defined 'point and click' behavior patterns by the computer interface.

Similarly, because primary tools, models, and systems for delivering, configuring, and distributing play energy have not been available, active and expressive play is absent from many educational classroom activities and products. This component, an active and defined play component, has been missing from systems because it has not been clearly seen or rendered practical enough to materialize beyond the tightly confined limits of the monitor and the keyboard. For example, images found on computer screens or on the pages of books remain anchored there with no practical way to move them off for physical manipulation, use, or play.

To grasp the full significance of the problem, it is helpful to be familiar with recent research to apply brain science to educational practice. Recent developments in evolving high-touch tools and applied brain science include: The Hand (Frank R. Wilson); sign language and gesturing studies (MIT Media Lab); Learning and Intelligence Systems (National Science Foundation); The Triune Brain (Paul MacLean, National Institutes of Health); the Smithsonian Institution's Object-based Education mission as well as its recently sponsored program, The Playful Mind.

The recent acknowledgment of music's capacity to modulate and enhance brain development in young children leads us to consider the deeper roots of learning. To reform the infrastructure of education, similar tools of transformation may be applied to the neurological nerve centers of communication and language.

The advent of the Internet has allowed the introduction of distance learning techniques and interactive educational and entertainment experiences. One such system is described in U.S. Pat. No. 5,974,446, directed to an internet based distance learning system. This system allows clients to communicate with each other or with teachers using different communication techniques via a common user interface. More specifically, this system integrates the use of a plurality of different communication techniques for interfacing over the Internet between a central server and a plurality of independent user computer stations which are geographically separated. This system creates virtual common room atmosphere for all the users which allows real-time interactions among the users irrespective of their geographical location.

Another example of an educational system using interactive multimedia is found in U.S. Pat. No. 5,978,648, which focuses on an assessment system used by students, educators and administrators to build an evolving student portfolio over the years of schooling whereby interests and activities emerge and are recorded that point the student in a variety of directions for potential vocations and advocations.

While many new enhancements to technology and media continue to evolve within high-tech platforms (such as those described in the aforementioned patents), the one sphere for training, education and entertainment that remains completely absent—because it is so difficult to grasp and even more difficult to include as a viable component—and even more so as one whose use and impact is seen outside and away from the computer—is the one involving the use of the hand. In both evolutionary and immediate terms, the use of the hand is considered a major facilitating agent of verbal communication in the learning process. The computer output and use of handheld, moving and talking artifacts and images made exclusively of paper (and the on-line modeling thereof) represents a unique convergence of biologically-based play energy, media, and technology. This unique formula for delivering play-based learning and communication results in higher-level expressiveness, emotional and visual thinking. To capture and engage the hands-on sphere (which is known to facilitate the oral communication) and apply it as handheld, moving artifacts to expressive communication, emotions, images, represents a unique, fundamental amalgam of biological energy (play), media, and high technology. Absent from the prior art is the hands-on component, a playful component in which a relationship between the student, the teacher and images (visual-textual information) is advanced. The advent of computers and the internet has opened a whole new era for education, and yet the images found on computer screens remain anchored and flat. Educational applications of the computer must inevitably find ways to push past the monitor and the keyboard.

Classroom communication is slowly becoming more than flat talk and text-covered worksheets. However, if adults are to reach the young in any meaningful way, communication must become more visual, interactive, emotive. It must reach all kinds of learners and appeal to students whose intelligence does not respond to traditional communication patterns and modes. It must engage the hands and create meaningful experience so that children can relate and remember what they learn. It should help to reduce stress by making group dynamics joyful and energetic. It must work to support learning skills and propensities that children already come equipped with so that teaching actually supports and recognizes the strengths that reside in every individual learner.

Long considered as symbols of play and more recently as tools for learning, puppets are widely recognized for their special influence on learning and social development, and have been shown to exert a powerful effect on children of all ages. Given the invasive problems and challenges of learning and socialization in mass society, which stem in part from breakdowns and inadequacies in communication, there is a high demand for modes of communication—especially in the classroom'that have a positive impact on children. Puppets have always met this need. While it is true that children play with all kinds of artifacts (not just puppets) that are often made to move and talk; a sustained, systematic application of participative play language, learning, communication, and technology, until now has not been available.

SUMMARY OF THE INVENTION

Accordingly, it is an object of the present invention to provide a system and method for creative and hands-on education and entertainment models and applications. More specifically, it is an object of the present invention to provide a puppetry-based communication system and method that promotes play and participation by children and others with images and symbols thereby enhancing communication, learning and entertainment. The puppetry based interactive media system and method of the present invention moves far beyond the character-specific puppet icon of Sesame Street into an Information Age application of media engineered to reach, touch, and involve people in dynamic and imaginative communication and learning experiences. The system and method of the present invention delivers a given image far beyond the screen-bound reality of 3D and opens a portal on live '4-D' experience—the process by which symbols and images leave the computer screen and emerge from between the covers of books (via printer) and are then constructed, played with or employed.

In particular, the present invention is broadly achieved by a puppetry based communication system and method comprising a computer environment including one or more images. A printer is connected to the computer environment for printing the images in paper form. A hinge is provided which is attached to the paper form. The hinge is adapted for hand manipulation to create a hand actuated puppet form, which is an animated representative of the image.

In another aspect of the present invention, a puppetry based communication system and method is provided wherein content providers and owners provide images, symbols and other proprietary content (collectively referred to as "images") to a puppet site. The puppet site reconfigures the images, symbols and other proprietary content to include a hinge area such as a W-hinge as described further below, which, when such images are downloaded in paper form, the hinge area is adapted to be hand manipulated to form the paper form into a hand actuated puppet representation of the image. The hinge provides an important system feature that enables the programmatic and predictable assembly of the puppet forms. Users, such as children, teachers and parents, subscribe to the puppet site and download selected images in paper form. The paper forms are formed into hand actuated puppets representative of the images and are used for communication, play, entertainment and learning.

Thus, according to the present invention, customized puppet concepts can be printed or downloaded as images, patterns, or illustrations that are quickly turned into puppets, and which can then play and participate in the real time and space of users and readers everywhere. Normally people view images passively, as with TV or story books. Consider cartoons which are conveyed across a linear screen and viewed passively for entertainment on television. The present invention provides an alternative paper cartoon character in which the cartoon (in a form still true to its illustrated and graphic integrity) is accessed as a handheld puppet form.

In another embodiment of the present invention, a puppetry based business method is provided.

In another aspect of the present invention, a puppetry based communication system and method is provided which includes a computer site configured with a training laboratory having multimedia audio and video files to provide demonstrations and modeling of skills and techniques associated with puppet-based learning and communication. In yet another embodiment a computer readable medium is provided which contains instructions which, when executed by a computer provide one or more images and allow the selection of the one or more images and enable a user to print the one or more images.

BRIEF DESCRIPTION OF THE DRAWINGS

Other objects and advantages of the present invention will become apparent upon reading the detailed description of the invention and the appended claims provided below, and upon reference to the drawings, in which:

DETAILED DESCRIPTION OF THE INVENTION

Figure 1:
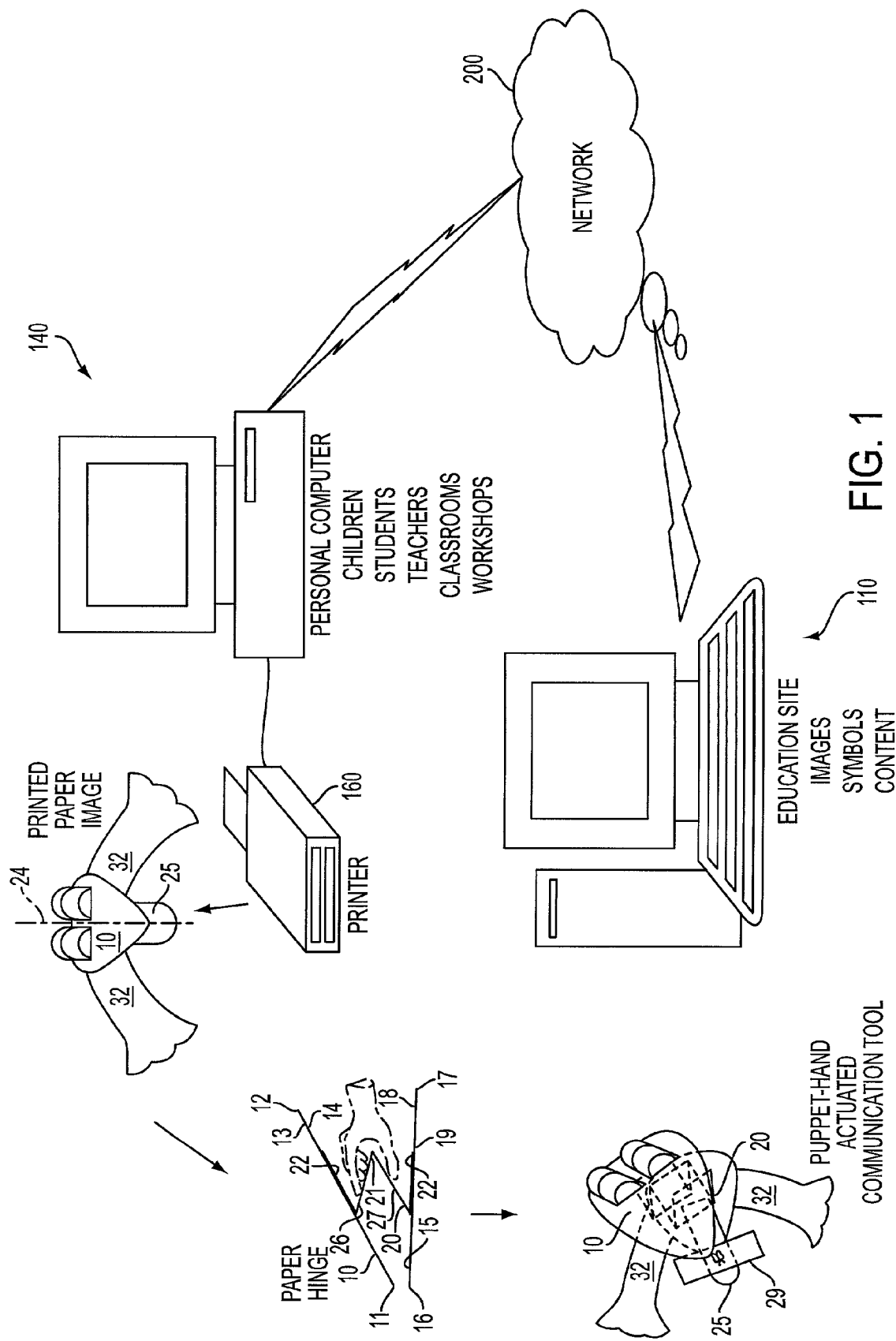
FIG. 1 is a block diagram illustrating the puppetry based system of the present invention

The present invention provides a very powerful tool. In a broad sense because play—with its accompanying power to drive learning, empower teaching, and provide a humanizing and socializing force missing from traditional classroom environments—is delivered according to the system and method of the present invention as a tool, language, media and model; the invention is capable of transforming learning environments from linear, text-bound, passive, often uninvolved rooms into places charged with emotive, energized, visual, playful relationships and experiences.

In contrast, because primary tools, models, and systems for delivering, configuring, and distributing play energy have not been previously available, active and expressive play is absent from many educational classroom activities and products. Until now, this application/component has been missing from systems because it has not been clearly seen or rendered practical enough to incorporate. Indeed, the question as to whether images have a role to play other than the two dimensional role for which they are originally designed has rarely, if ever, been asked because images or illustrations have not be seen as physical, handheld, and printable puppet artifacts.

Hence, the present invention offers a way out of the box (the computer) and a way out of the linear, text-based, left-brained 'box' (behavior) that defines most teachers and most classrooms. This is a play-driven change-agent that works on the infrastructure and culture with a direct and immediate impact on classroom communication, language, and behavior. It provides a way to use computers and the Internet to humanize learning and classroom communication outside the computer 'box'. Hence, as the computer continues to promote a further shift toward a visual and right brain perspective, the present invention turns ingredients of computer activity—hand, paper and image—into a play-driven communication system that promotes and facilitates the broader impact of right brain visual thinking, processing and communicating.

Thus, in preferred embodiment of a book or computer utility, customized puppet concepts can be printed or downloaded as images, patterns, or illustrations that are quickly turned into puppet artifacts, and which can then play and participate in the real time and space of users and readers everywhere. Normally people view images passively, as with TV or story books. Consider cartoons which are conveyed across a linear screen and viewed passively for entertainment on television. With the inventive system and method an alternative paper cartoon character in which the cartoon (in a form still true to its illustrated and graphic integrity) is accessed as a handheld puppet form.

The puppetry based educational system and method of the present invention is now described in detail with reference to FIG. 1. Generally, the system is comprised of a computer environment 100 which includes a puppet computer site 110 which is connected via a computer network 200 to one or more remote computer sites or remote users 140. From the computer environment is generated one or more images. Desired images are selected by the user and downloaded. The images are printed to produce a paper form 105 of the image. In one embodiment the paper form 105 includes a hinge 20 built into the image of the puppet. As described further below, in an alternative embodiment a W-shaped hinge 20 is folded and affixed directly to the puppet parts (such as the face or jaw and extended body shapes).

The W-shaped hinge 20 is a separate piece of paper which is downloadable and then attached or glued to the front and back side of the paper form. The W-shaped hinge may be downloaded along with a page including printed instructions for folding the W-shaped hinge. Alternatively, an on-line video clip of the folding sequence is provided. In either embodiment the hinge is adapted to be hand manipulated to form a hand actuated puppet of the image.

Figure 2:
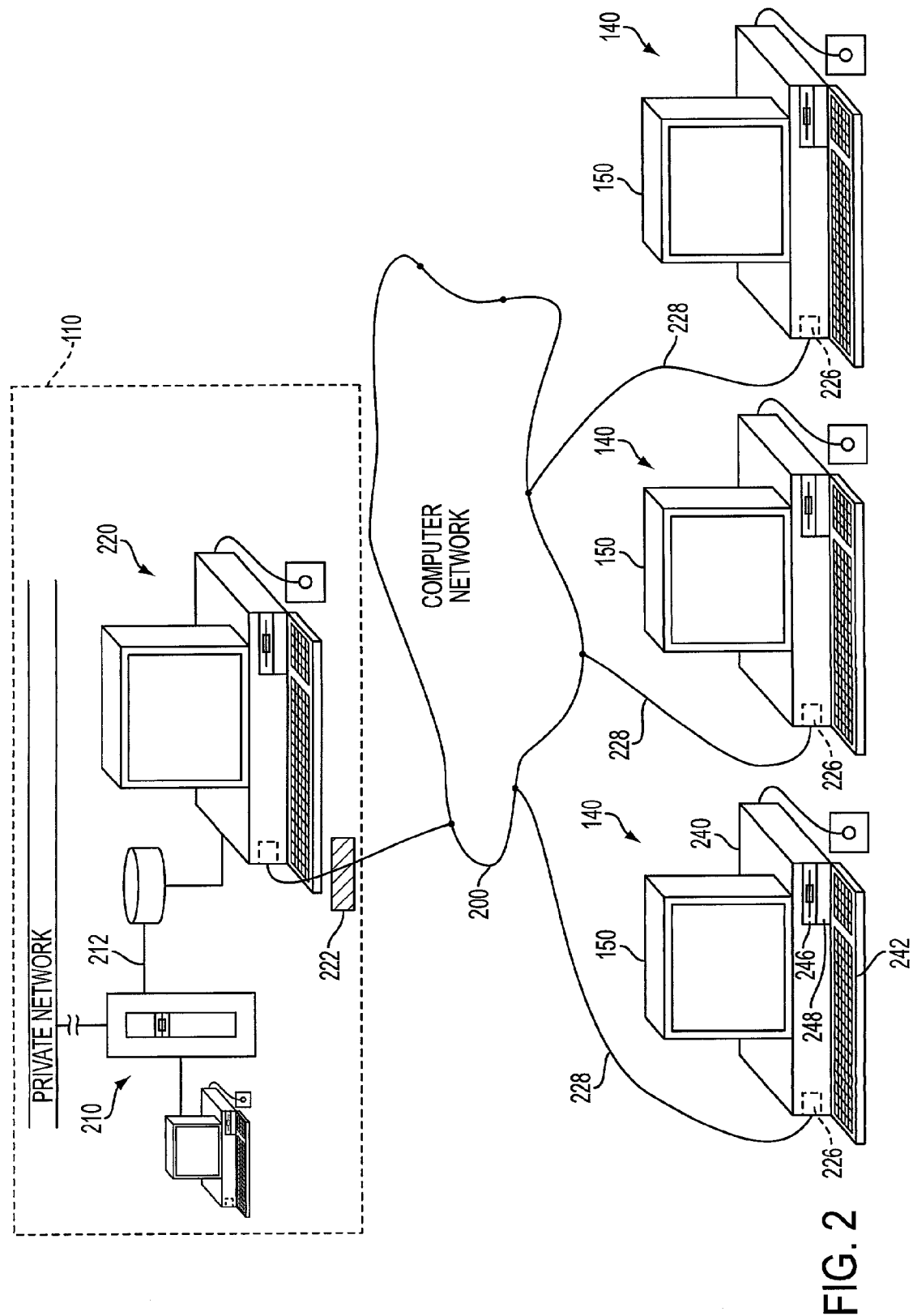
FIG. 2 is a schematic diagram illustrating the configuration of a computer network according to one embodiment of the system of the present invention.

One embodiment of the computer system for carrying out the puppetry based system and method of the present invention is further shown in FIG. 2. Preferably, the system 100 is implemented through software executed on the puppet site 110. The puppet site 110 includes a primary or host computer connected to computer network 200, and typically includes a website that organizes content, such as directing the user to select various images, symbols, media and content (collectively referred to as "images") to be downloaded and printed. The puppet site 110 may include one or more computers, and preferably includes a primary or host computer 210 connected via a line 212 to a server 220, preferably an internet server. The line 212 may be any suitable connection such as a direct connection, a modem, wireless connection, and further can be a private network such as a local area network (LAN), or other intranet.

The server 220 is connected, preferably via a high speed multi-line telephone interface 222 to a computer network 200. In one embodiment, the computer network 200 is the World Wide Web (Internet) computer network, and is connected to the one or more remote user sites 140. The remote sites are typically remote desktop computers 150 (as shown) that are connected to the network 200 via modems 226 and telephone lines 228 using standard communication protocols. The remote sites may also be connected together, for example via a local area network (LAN) or wirelessly, such as in a classroom, school, learning center or workshop. The remote sites 140 may also be comprised of other forms of computers such as workstations, laptop computers, palm tops, dumb terminals, another computer network, or any other computer capable of communicating with other computers. Other suitable connections may be used such as a direct connection, wireless connection, wired connectors such as a modem and a TI line, or a high speed data line such as a digital subscriber line (DSL). When the connection is wireless, data transmission is preferably configured to the industry standard wireless application protocol (WAP). The computers may be a conventional design, utilizing a central processing unit (CPU) 240 and various memory and supporting circuitry. Connected to the processor 240 is a keyboard 242, and monitor 244. One or more external memory devices 246, such as but not limited to a floppy drive, hard disk drive, PC memory card, zip drive, CD-Rom drive, CD-Rewritable drive, DVD drive, and the like may also be incorporated in the computer, and may be used for downloading and/or storing the images from the educational site. Connected to one or more of the remote computers 150 is a printer 160.

Referring again to FIG. 1, the image is shown printed out from the printer 160 in paper form 105. The image is turned into a puppet using the hinge described in U.S. Pat. No. 4,555,236 which is hereby incorporated by reference in its entirety. Alternatively, the hinge as described in U.S. Pat. Nos. 4,869,705 and 4,880,404 may be used. The disclosures of the '705 and '404 patents are also hereby incorporated by reference in their entirety. Specifically, the paper form of the image is comprised of a flat upper panel 10 having front and rear extremities 11 and 12, respectively, and upper and lower surfaces 13 and 14, respectively; flat lower panel 15 having front and rear extremities 16 and 17, respectively, and upper and lower surfaces 18 and 19, respectively; and a W-shaped hinge 20 having center bight 21, opposed straight legs 22, and upper and lower angled portions 26 and 27, respectively.

The flat upper panel 10 is contoured and decorated in a manner to present the appearance of some recognizable image. The image may have any appearance. For example the image may have the appearance of a symbol; a logo; a word or phrase; it may depict a scene or picture; it may depict a face, or a person or an animal, or some inanimate object. In other words any image may be used with the present invention. When the panel is a face, it well generally contain indicia or other suitable ornamentation to represent eyes 23. In other embodiments, a nose, ears, eyebrows, eyeglasses or other features associated with a face may be present. The front extremity 11 of the upper panel 10 may be intended to represent the mouth of the image, if applicable. The face represented by the upper panel 10 of the puppet of FIG. 1 is symmetric about plane 24 which vertically bisects upper panel 10 in an orientation directed between front and rear extremities.

In the embodiment when the image is a face, such as an animal face shown in FIG. 1, the lower panel 15 is configured and/or decorated in a manner such that front extremity 16 has the appearance of the lower jaw or tongue of the animal. Both the upper and lower panels are preferably fabricated of paper or cardboard sheet stock which is stiffer than letter-grade paper, yet sufficiently resilient to flex. The hinge can be made from typical printer bond, but the best stock will be common construction paper or light card stock.

The W-shaped hinge is preferably fabricated of the same sheet stock from which the upper and lower panels are fabricated. The hinge has a sufficient width, for example such as between 1.5 to 4 inches, so as to facilitate grasping and manipulation, and preferably should not protrude beyond the boundaries of the panels. In this example, the upper straight leg 22 lies flush against lower surface 14 of the upper panel, and the lower straight leg lies flush against upper surface 18 of the lower panel. The legs are bonded to the surfaces preferably by adhesives. It is to be noted that this line of bight 21 is oriented perpendicularly to said plane of symmetry. In the case of the puppet shown in FIG. 1 the lower panel serves the further purpose of a lower gripping member, the reason being that the configuration of the panels and their orientation about the hinge permits abutting contact at a site adjacent their front extremities. In its operational configuration, the puppet shown in this one embodiment is manipulated by grasping the angled portions of the hinge in a manner such that the thumb engages lower angled portion 27, and the opposed four fingers engage upper angled portion 26.

In an exemplary embodiment, finger engaging means in the form of pockets 32 and 33 are associated with the upper and lower straight legs respectively. Each pocket is elongated in the direction extending between front and rear portions of the puppet, and is provided with an opening 34 directed toward the rear of the puppet. In operation, three or four fingers of the user are inserted into the upper pocket and the thumb is inserted into the lower pocket. The index finger may be brought to bear against the outside of the lower pocket in abutment with the thumb within the pocket. The pockets are fabricated either by the use of a convolutedly folded strip as the hinge or by selectively adhering just the long edges of the straight legs to their respective panels. Alternatively, the pockets may be absent and the puppet is hand actuated by the hinge alone.

Figure 7:
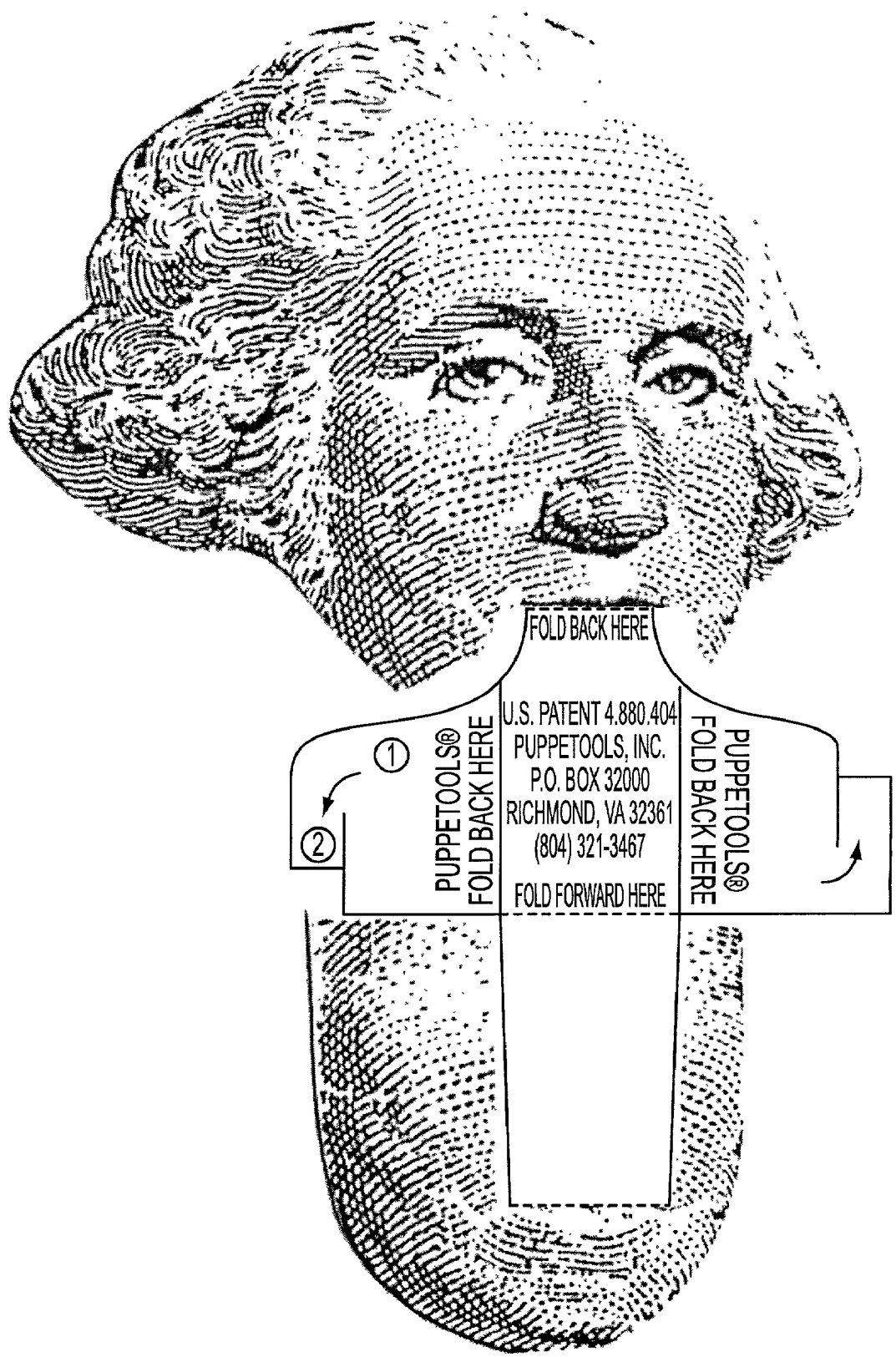
FIG. 7 is one example of a puppet having a hinge incorporated within the puppet form according to one embodiment of the present invention.

The hinge will be printed separately in the case of the w-hinge. The alternative hinges are designed 'hardwired' into the image, published to the web, and are then printed (like the George Washington Picture Puppet shown in FIG. 7). Thus, the image has now become a puppet and as such is a hand actuated communication tool which is used by children, teachers, students, parents and others for play, communication and learning.

One exemplary embodiment of the puppet site 110 is now described in further detail with reference to FIG. 3*a*. In general the puppet site 110 will include a state of the art 'show and tell' focus on classroom communication with teachers and kids and their high levels of creativity, spontaneity, and enthusiasm. In this particular embodiment, the remote sites 140 will be their classrooms and workshops. Any number of remote sites 140 may be connected to the puppet site 110 and the remote sites may be in separate geographical locations. Images may be provided to the puppet site by one or more content providers or owners 310.

In another embodiment the puppet site 110 features a place where all this innovation and creativity can be gained such as a puppet lab. The lab provides a training "laboratory" which includes multimedia audio and video to provide demonstration and modeling of skills and techniques associated with puppet-based learning and communication. More specifically, the puppet site 110 is preferably a computer environment. As a system the invention includes computer hardware and software. Preferably, the system is implemented through software executed on the puppet site 110. The puppet site 110 includes hardware and software configured for receiving images, manipulating the images, and for downloading and/or printing the images. Such hardware and software is commercially available and may be programmed by one of ordinary skill in the art based on the teaching of the present invention. Preferably the puppet site 110 includes a website that organizes content, such as displaying the images by category or in response to a key word search, and provides for their selection and downloading by users.

Alternatively, the system may be implemented through software executed on computer readable medium such as a computer program or CD which may be sold to users for independent execution on their computers 250. In this embodiment, the computer program 200 is executed on a computer as illustrated in the high level block diagram of FIG. 3*b*. In this embodiment a computer 250 typically stand alone, incorporates a processor 252 utilizing a central processing unit (CPU) and supporting integrated circuitry. Memory 254 may include RAM and NVRAM such as flash memory and the like, to facilitate storage of the computer program 200 and the operating system software. Also included in computer 250 are a keyboard 258, pointing device 260, and monitor 262, which allow a user to interact with computer 250 during execution of programs. Mass storage devices such as disk drive 264 and CD ROM 266 may also be included in computer 250 to provide storage of information. For instance, in an exemplary embodiment of the puppetry system of the present invention, a database containing information or data representing the images, which may be printed to create puppets representing such images, can be stored in disk drive 264 or CD ROM 266. Computer 250 may additionally include resources for allowing the selection of certain of the images, and may include resources for allowing the reconfiguration of any of the images to create new, personalized images. Computer 250 may communicate with other computers and/or networks via modem 268 and telephone line 270 to allow for remote operation, or to utilize files stored at different locations. Other media may also be used in place of modem 268 and telephone line 270, such as a direct connection, high speed data line or a wireless connection, and the like. The components described above may be operatively connected by a communications bus 272.

In the preferred embodiment, the images are displayed thumbnail size to be enlarged, for enhanced view, and then formatted for printing. The system can draw on all facets of printed images—from generic images of the public domain (such as the presidents found on cash bills); simple theme symbols (characters seen on printed matter such as notepads) to the most visible and proprietary characters of advertising and entertainment. The concept of clip art is now a widely understood and utilized product. Taking the concept of clip art a giant step further, the present invention constitutes a proprietary resource for hand-actuated communication.

Figure 3A:
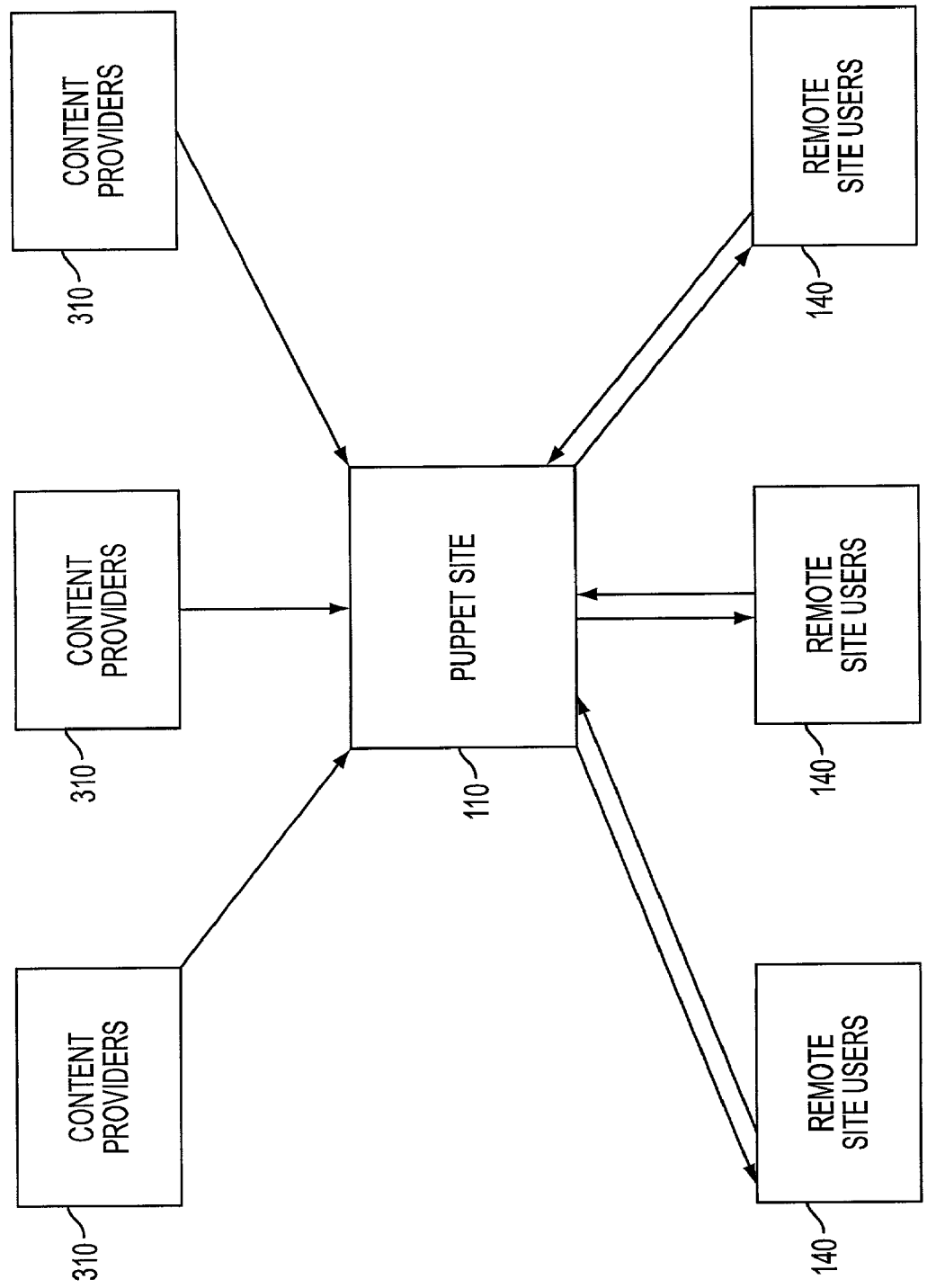
FIGS. 3a and 3b are block diagrams of the system of the present invention according to two alternative embodiments.
Figure 3B:
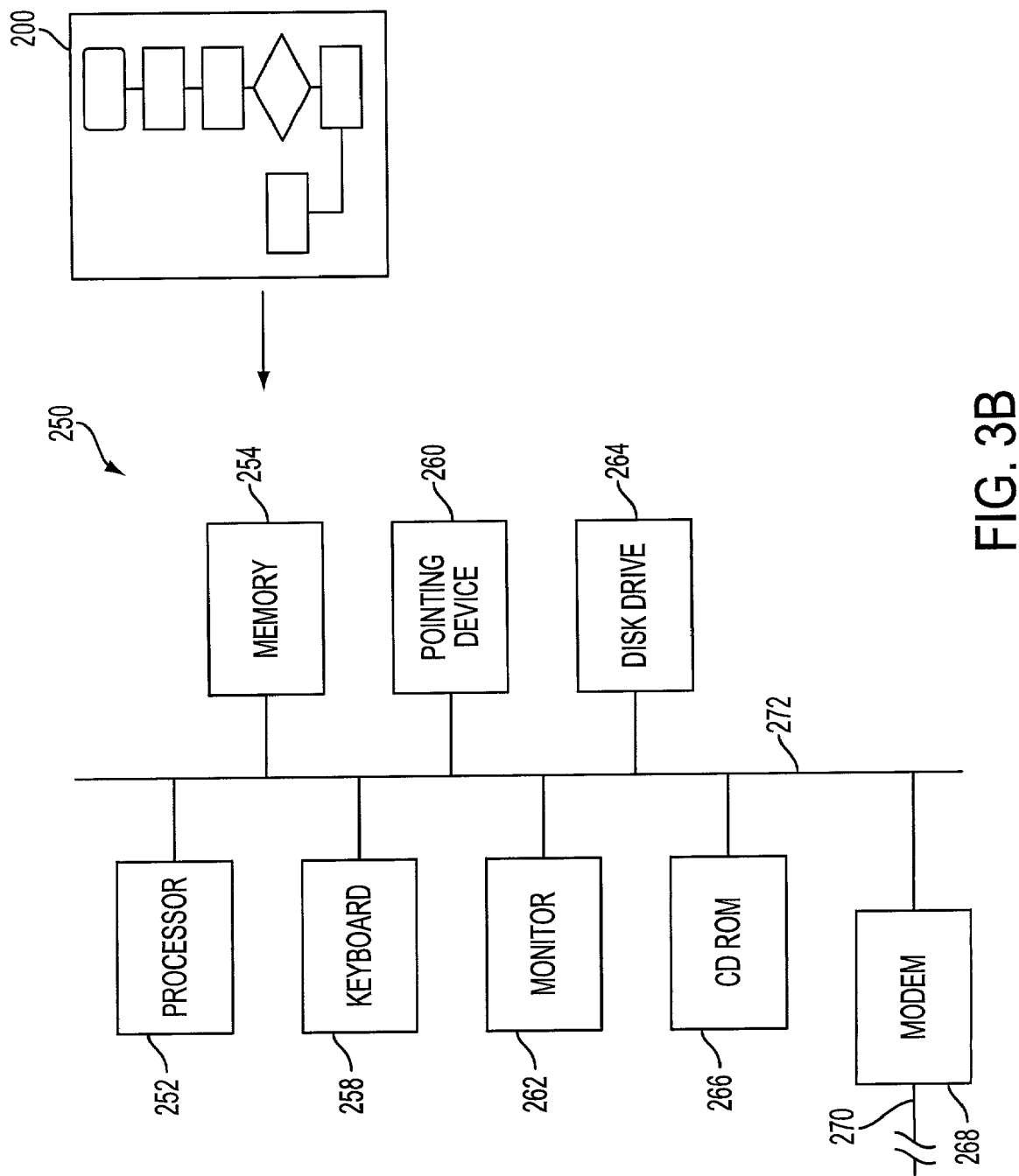

As shown in FIG. 3*a*, a variety of content providers or owners 310 may provide images to the puppet site. Generally, the images comprise the following categories; however other categories may also be developed as appropriate.

Generic/Public Domain/Lookalikes
Photographic/Illustration/Cartoon
Modular/Pattern
Media/Proprietary In many cases, images may be freely provided to the puppet site 110 based on the motivation to extend the visibility and life of the artwork or mascot; for example, in the case of greeting cards. Other content providers will require permission for use and display of the images such as a license, and/or payment.

The content providers 310 may come from any source and is not limited in any way, and typically are creators, owners or licensees of images. The images are provided in electronic form to the puppet site in a format suitable for reproduction, display, formatting and downloading using conventional software.

Figure 4:
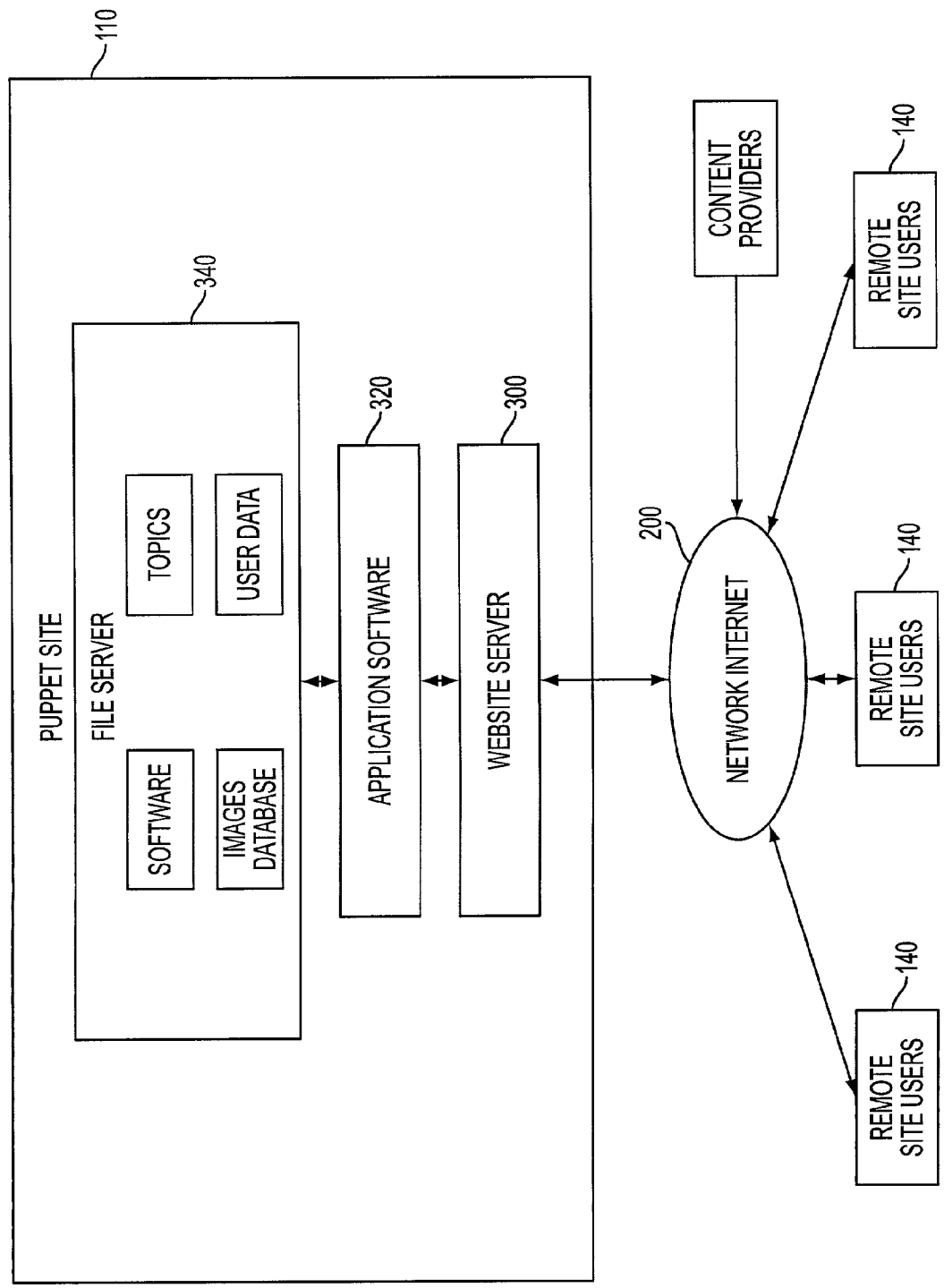
FIG. 4 is a simplified network block diagram of the system of the present invention.

More specifically, as shown in the simplified block diagram of FIG. 4, the puppet site 110 is a computer environment or network and may include a plurality of computers which host web sites 300 for access by the remote users 140 and run various applications 320. The puppet site 110 also includes a file server 340, which includes various databases such as image databases, user databases, topic specific databases for categorizing the images, and appropriate software. The puppet site 110 may include support for a chat room. Further, video and audio files can be available to support a distance learning laboratory. In a preferred embodiment, the puppet site 110 includes one or more software modules that reside in memory or on storage that support and operate the website 300.

Figure 5A:
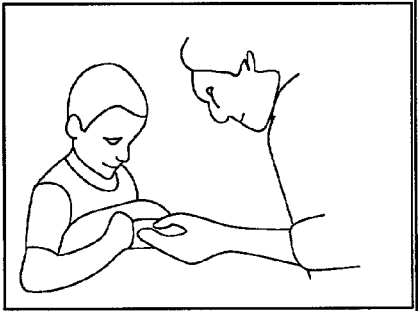
FIGS. 5a-5c are diagrams illustrating a number of exemplary user interfaces according to one embodiment of the present invention.
Figure 5B:
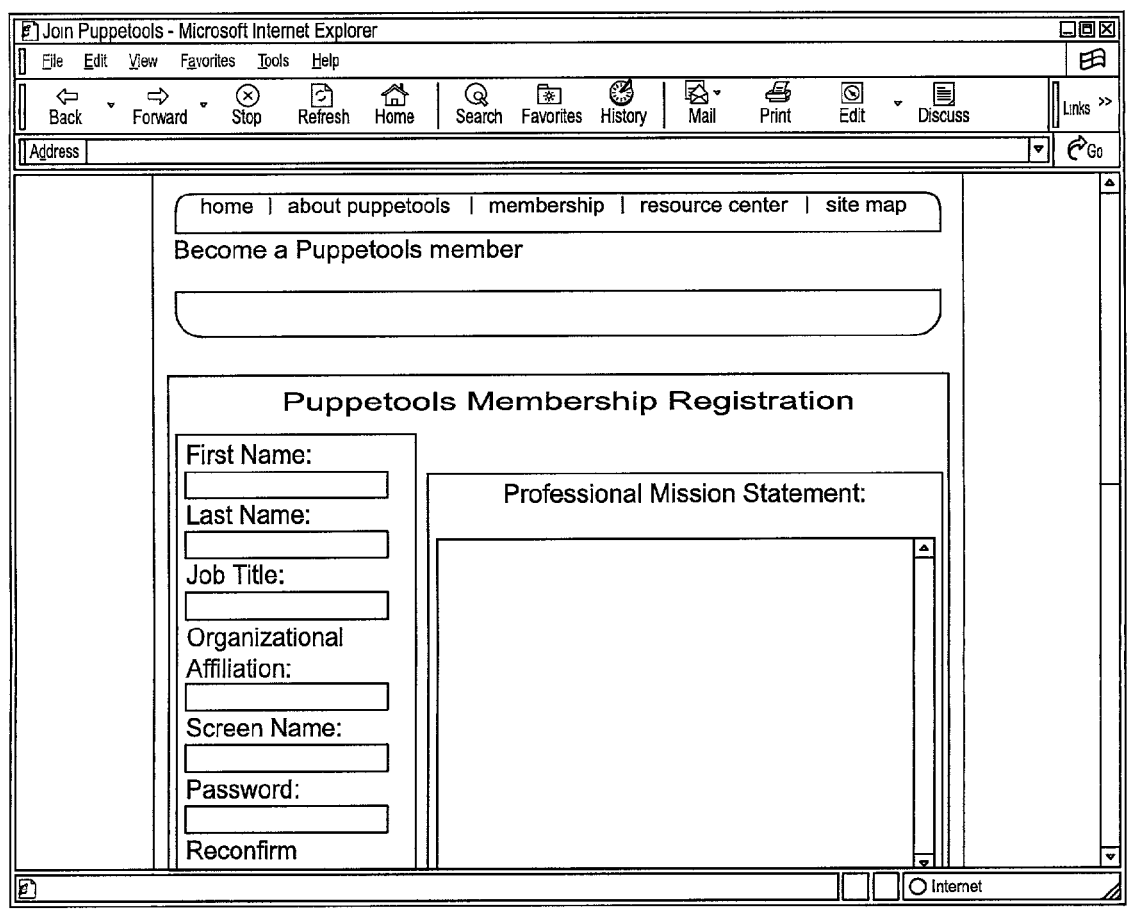
Figure 5C:
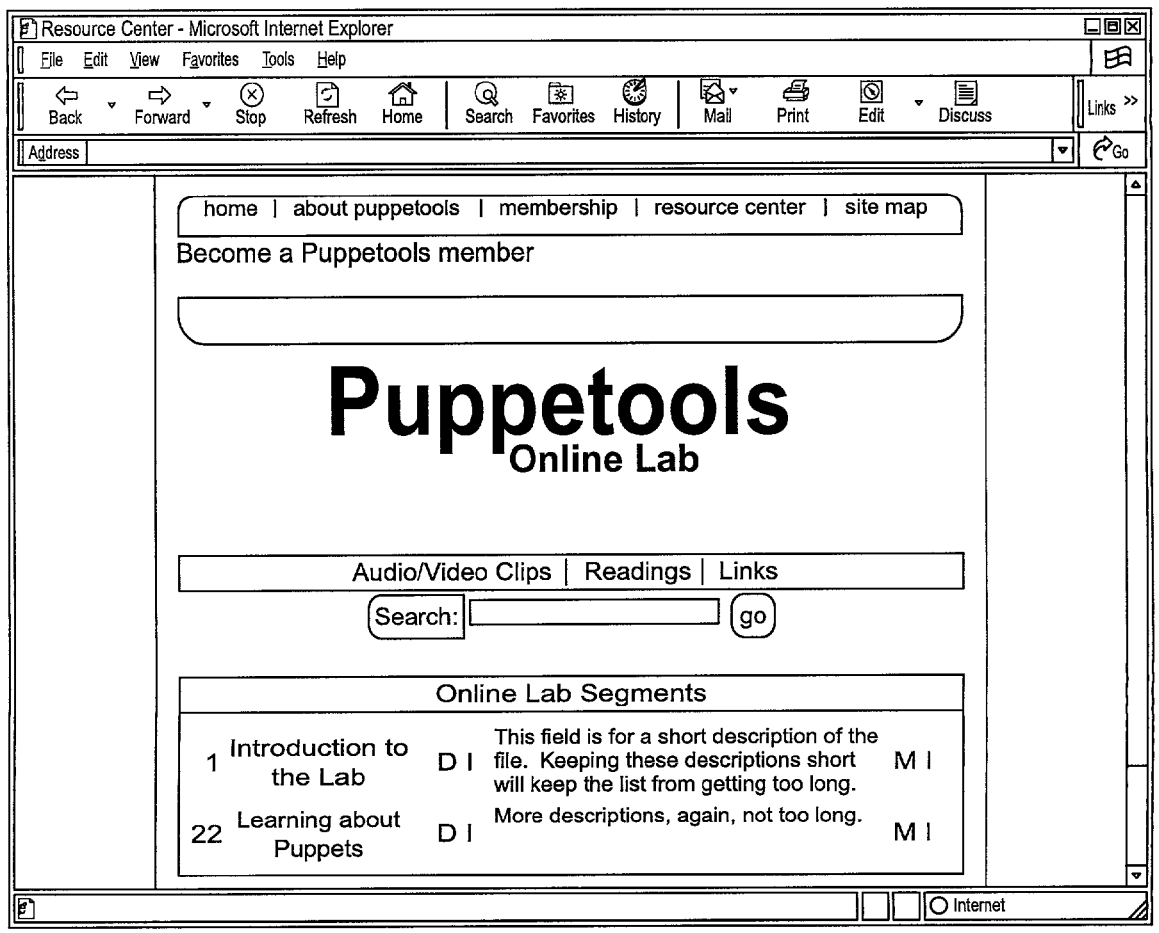

The content, often organized in websites 300 maintained on computers at the puppet site 110, typically offer and display various images, as well as instructional and educational content, allows for group participation in a chat room and the like. An operating system and browser program (not shown) is also included in the remote computer 140 so that a user may access the website 300. By searching or browsing the content in the websites, a user is able to select and of the various images for downloading, as well as select other related services. Exemplary embodiments of a user interface are shown in FIGS. 5a to 5c. Specifically, in one embodiment the user interface is comprised of a plurality of website pages, for example those illustrated in FIGS. 5a to 5c. Generally, the sites include an opening page (FIG. 5a) which contains general information about the website, and may include current events and announcements, membership information and the like. Membership registration may be accomplished on a registration page. One example of a registration page is shown in FIG. 5b. Links may be provided such as a resource center or site map. The opening page also typically provides for log-on to the site.

One example of the on-line training labs is shown on the web page in FIG. 5c. The web page generally includes a listing of the plurality of on-line developmental segment files along with a short description of each. Audio/video clips are accessible via this page, as well as a search function. Other readings and links are also available. While specific examples have been shown, such examples are for illustration purposes only, and it is to be understood that the content and layout of the web pages may vary greatly, and that many variations in content, layout and organization may be made within the scope of the present invention.

Figure 6A:
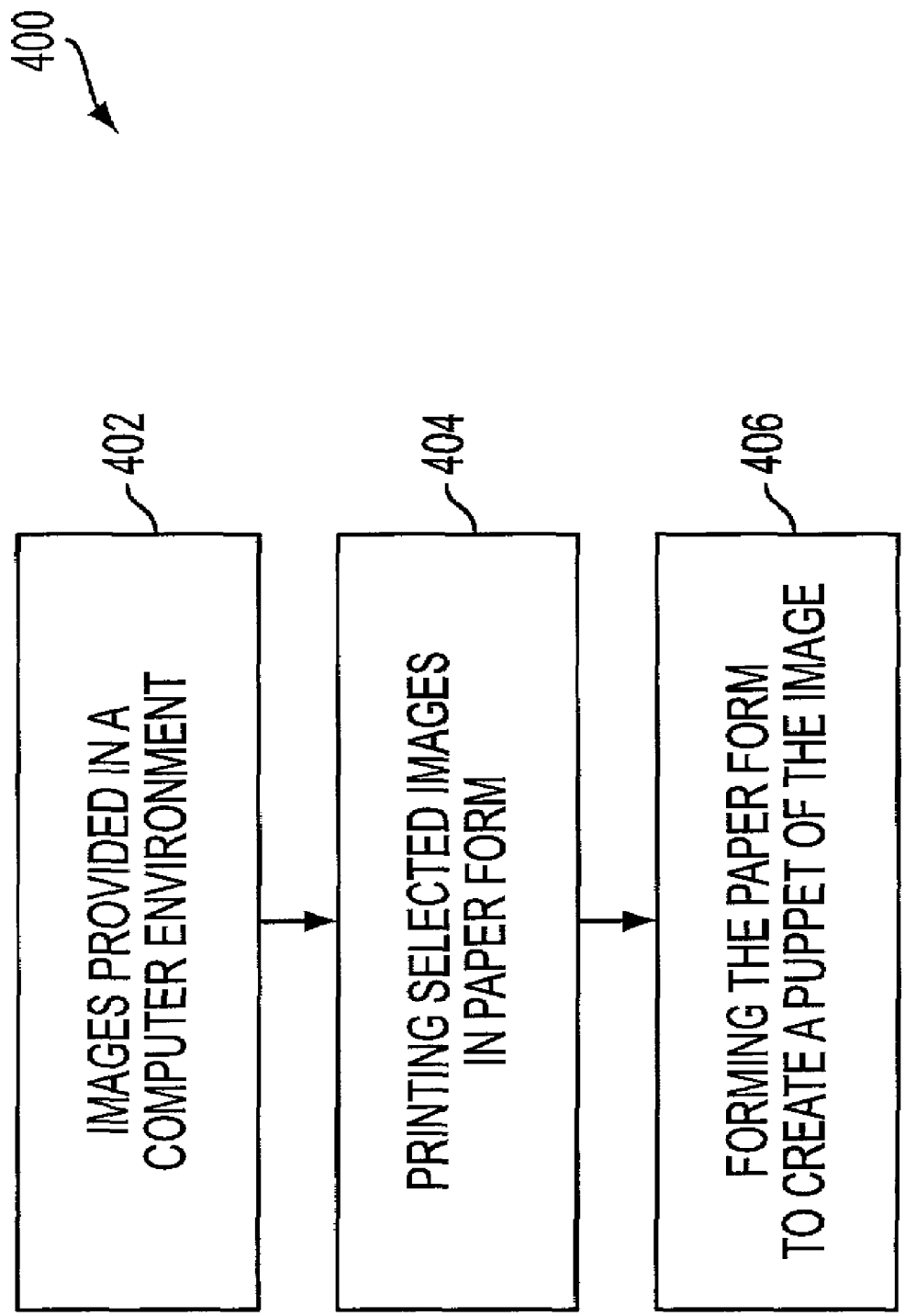
FIGS. 6a and 6b are flow charts depicting the puppetry based educational method according to two embodiments of the present invention.

The method of the present invention is broadly shown in FIG. 6a. In general, the method 400 of the present invention comprises the steps of providing images in a computer environment in step 402. Selected images are then printed in paper form at Step 404. The paper form is then formed to create a puppet representative of the image in step 406. When using the W-shaped hinge, construction and affixing of parts to the W-shaped hinge is done manually by the user. The alternative hinge forms are built into the puppet image and printed out, and then manually folded by the user.

In another aspect of the present invention, the system and method includes a business model, wherein content providers and owners 310 provide images to the puppet site 110 for display and printing by the users 140. The users are registered as subscribers or members of the puppet site. Typically, the users pay a fee, such as a yearly membership subscription fee for access to the puppet site 110. The puppet site 110 includes file server 340 with appropriate databases for maintaining information regarding individual members. Additionally, the puppet site 110 includes appropriate databases for maintaining the many images.

As mentioned above, in another embodiment the puppet site 110 includes an on-line training laboratory. The training laboratory is comprised of a plurality of developmental segments. The developmental segments generally include video and audio files to facilitate training. For example the developmental segments may include, but are not limited to, video and audio files that provide demonstration and modeling of skills and techniques associated with puppet-based learning and communication. The laboratory provides true distance learning. Table 1 below shows examples of topics of some of various audio and video files that may be employed within the present invention. These include demonstration segments on how to fold the hinge and how to construct a storybook puppet, as well as classroom demonstrations which show the puppet based learning and communication system in action. These segments are programmed with conventional known programming techniques and may be available on a variety of known media software platforms.

TABLE 1

| Windows Media | Real Media | Quick Time |
|---|---|---|
| FOLDING THE HINGE 28 56 T1 slide show 28 56 | FOLDING THE HINGE/ slide show | |
| BEYOND THE HINGE 28 56 T1/ slide show 28 56 | BEYOND THE HINGE/ slide show | BEYOND THE HINGE_T1 BEYOND THE HINGE_56 BEYOND THE HINGE_28 |
| STORYBOOK PUPPET CONSTRUCTION 28 56 T1/ slide show 28 56 | STORYBOOK PUPPET CONSTRUCTION/ slide show | |
| COOKIE'S WEEK 28 56 T1/ slide show 28 56 | COOKIE'S WEEK/ slide show | |
| PETER RABBIT 28 56 T1/ slide show 28 56 | PETER RABBIT/ slide show | |
| THE BEE 28 56 T1/ slide show 28 56 | THE BEE/ slide show | The Bee 56 |
| THE LUNGS 28 56 T1/ slide show 28 56 | THE LUNGS/ slide show | |
| THE STOMACH 28 56 T1/ slide show 28 56 | THE STOMACH/slide show | |
| ESL STORY/ 28 56 T1/ slide show 28 56 | ESL PUPPET & STORY/slide show | |
| DEMONSTRATION CLASSROOM 1 Meet the Puppets 28 56 T1/ Slide Show 28 56 | DEMONSTRATION CLASSROOM 1 Meet the Puppets/ slide show | |
| DEMONSTRATION CLASSROOM 1/ The Lesson 28 56 T1 Slide Show 28 56 | DEMONSTRATION CLASSROOM 1/The Lesson/slide show | |
| DEMONSTRATION CLASSROOM 1 AUDIO/ Teacher insight & commentary | DEMONSTRATION CLASSROOM 1/ AUDIO/Teacher insight & commentary audio 1 audio 2 | |
| DEMONSTRATION CLASSROOM 3/5th Grade/ Puppet Interviews 28 56 T1 Slide Show 28 56 | DEMONSTRATION CLASSROOM 3/5th Grade/Puppet Interviews Slide Show | |
| | DEMONSTRATION CLASSROOM 3/ AUDIO/Audio Journal: 5th grade teacher's commentary | |
| Halloween Pie 28 56 T1 Slide Show 28 56 | Halloween Pie Slide Show | |

TABLE 1-continued

| Windows Media | Real Media | Quick Time |
|---|---|---|
| Germs: The Yucky Video 28 56 T1 Slide Show 28 56 Friends 28 56 T1 Slide Show 28 56 Music The Rainforest/High School project Feelings and Empathy International Animals Birds Dinosaurs & Reptiles Plants Earth Science (planets & rainbows) Explorers & Pirates Seasonal Puppet Concepts Inanimates Social Skills Reading Math Social Studies Science/7th Grade/Exploring Sub Atomic Particles with 'The Atoms Family' | Germs: The Yucky Video Slide Show Friends Slide Show | |

The segments are generally self paced and may include any one, or combination of, the following content and functionality:

On-line Video and Audio Segments; instructions on construction of the puppets, segments which facilitate Communication, Show & Tell, Journal Writing, Curriculum Link, Problem-Solving segments, Storytelling, Children's Workshop, Adult Workshop, Staff Development, Evaluation, Research Associate, Special Project Partners, and Special Education.

Each lab segment typically explores a specific subject. Users can work in any segment at any time, and access the segment in any order. Users can search and query a database within the training lab, and communicate with other lab members. The database may include a library of research papers and articles in areas of interest to the users, as well as a library of downloadable images.

Figure 6B:
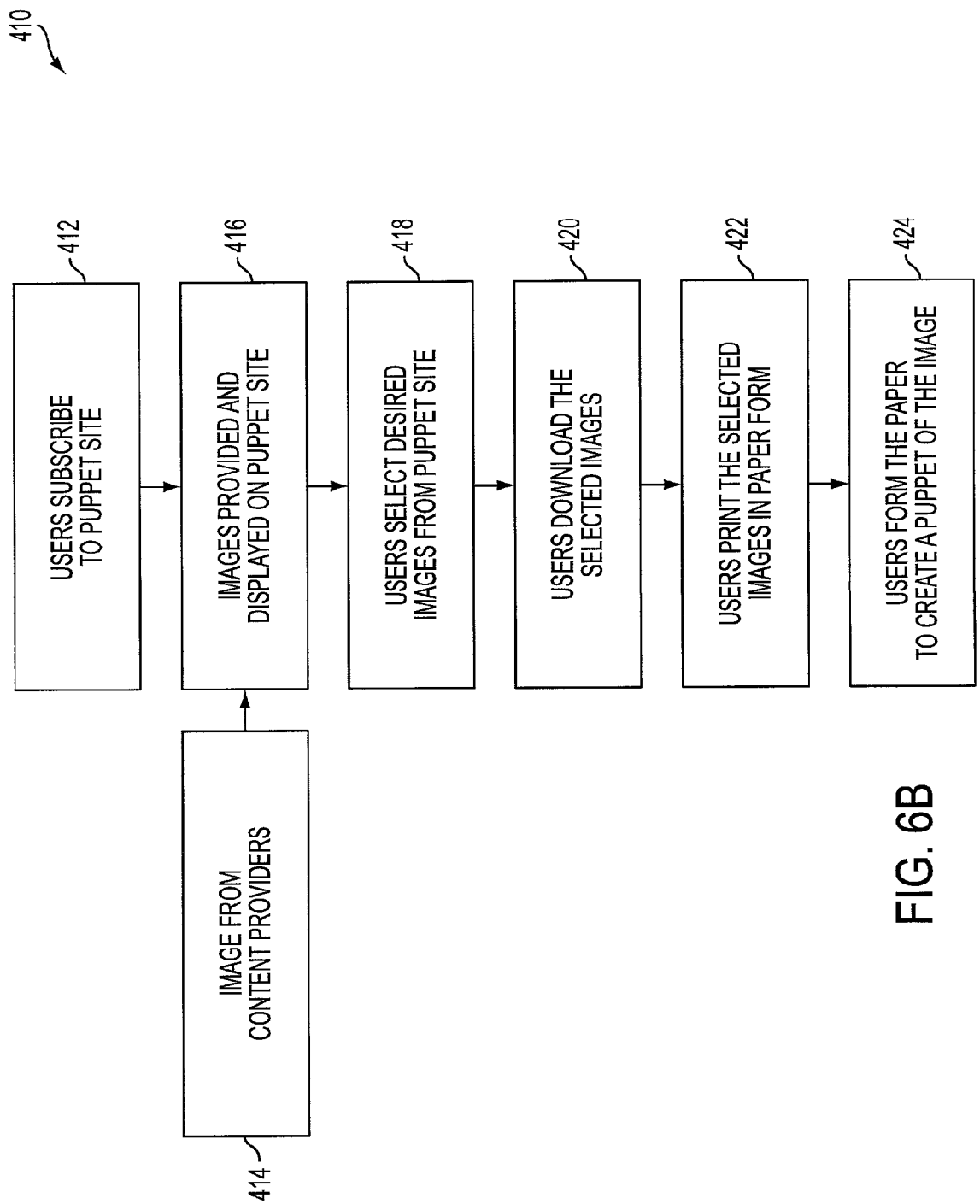

More specifically, an exemplary embodiment of the business model method 410 of the present invention is shown in the flowchart of FIG. 6b. The method begins at step 412 where users subscribe to the puppet site. Content providers and others provide their images (step 414) to the puppet site where the images are displayed on the puppet site at step 416. Users access the puppet site and select desired images at step 418. The images may be organized into various topic areas for easier browsing and searching. Users download the selected images and print the images on paper at steps 420 and 422. The printed images are then formed to create a puppet representative of the images at step 424.

The resulting puppets can be marketed through multiple platforms in addition to the internet accessed puppet site, and standalone CD application. These include pre-printed puppet characters, pre-printed puppet patterns, pattern software, children's books, magazine inserts, packaging such as cereal boxes, and puppet kits which include specialty papers. These visual characters are delivered not as symbolic dolls or plush toys, trading cards or collectibles.

To further describe the scope and impact of the present invention, a variety of applications are set forth below. These applications are for illustration only, and are not intended to limit the invention in any way. As will be apparent to those of skill in the art, the particular images provided are preferably tailored to the particular application. For example, for geography applications, images such as maps, and images of countries and states, and the like would be used. For example, in addition to being available via the puppet site the system and method of the present invention may be configured in an educational CD application and include images associated with the following topics or categories: history, social studies, geography, biography, science, health, environment, weather, space, oceans, computers, math, reading, letters, writing, punctuation, speech, social & language skills, literature/folk tales, story telling, adaptations of stories, oral expressiveness, listening skills, careers, humanities and cross-cultural education, to name some examples. Of course any of the applications described herein may also be available on the puppet site 110 and accessed via the Internet. Further, possible applications include: TESOL, foreign language, values/ethics, humane education, environmental education, economic education, law education, citizenship education, media awareness and puppet-use anecdotes.

The system and method of the present invention may be employed in Special Education programs, such as but not limited to: art therapy, learning disabilities, emotional disturbance, role-playing, sensory development, conceptual development, life skills, hearing impaired, visually impaired, problem-solving, behavior & prevention, self-image, following directions, discipline, courtesy and working together.

The system and method of the present invention may also be used to improve homework habits, organizational skills, critical thinking skills, independent work habits and independent thinking. Images may be used in the present invention to promote awareness of littering, noise, safety, poisoning, fire prevention & safety, gas safety, latchkey children, health, nutrition, substance abuse, child abuse, sex education, gender roles & values and adolescent pregnancy.

The system and method of the present invention may also be used to train teachers and others, such as for example in staff development, instruction & methodology, educational psychology, research, puppet how-to, voice techniques, movement techniques, motivation techniques, and student teaching projects.

Parents and other caregivers will find use for the system and method of the present invention to assist with areas such as parenting approaches and techniques, psychology, parent-child relations, toilet training, sharing, helping, sibling rivalry, discipline, personal hygiene, pre-school learning, nutrition, habits and home safety.

Further, the system and method of the present invention may be used by the medical and health profession in areas such as hospitalization & child-life programs, orientation, patient education, drugs awareness, rehabilitation, head injury, sensory stimulation, pediatrics, volunteer development, parenting, public relations, public information and special programs.

The present invention may use images to promote social awareness, on topics such as social missions, world hunger, population control, nuclear arms limitation, violence, literacy, health, nutrition, consumer action education, mental health, residential treatment, geriatrics, nursing homes, prisons, occupational therapy and parenting skills. The present invention may be used by organizations for uses such as recreation, youth/summer camps, service organizations, community awareness, religious education, higher education, government programs, volunteerism and commercial.

The present invention may also find use in the corporate field. For example, corporations may employ the system and method of the present invention with images/symbols/content directed toward in-house communications, community outreach, day care, retail, sales, promotion, marketing, employee training, public relations, international networks, user group development, staff development, membership development, fund raising, participation and anecdotes.

The present invention may also be used in the entertainment field and to promote the use and purchase of consumer items.

Thus, as can be seen from the aforementioned description, the present invention can be used in a vast number of applications in virtually all areas of life.

In summary, the foregoing description has provided a very powerful, wide ranging communicative puppetry based system and method. The system and method of the present invention has tapped into "play energy", which is both a real and physical aspect of evolution and brain development in children, a product of specific brain resources that can be effectively directed and applied, having a valid role and impact on education, namely through a systematic leading and driving of learning and communication, a process that is transmitted, housed, applied, and generated in a range of physical media and learning contexts via the use of the images and puppets. The system and method of the present invention provides a sustainable communication system for mass training and education.

As taught by the foregoing description and examples, a puppet based method system and computer utility are provided by the present invention. The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

I claim:

1. A puppetry based communication method for neurological development, comprising the steps of:
   providing one or more images in a computer environment, the one or more images being provided by content providers;
   configuring the one or more images to include a hinge area and being adapted for hand manipulation;
   a remote site user downloading selected of said one or more images to provide said images in paper form;
   forming said paper form to create a puppet representative of said image by affixing a hinge to the paper form; and
   interacting with an on-line training laboratory on the puppet site, the training laboratory comprising a plurality of developmental segments having multimedia audio and video files containing content, the plurality of developmental segments comprising: Instructions on construction of the puppets, Communications, Show & Tell, Journal Writing, Curriculum Link, Problem-Solving, Storytelling, Children's Workshop, Adult Workshop, Staff Development, Evaluation, Research Associate, Special Project Partners and Special Education,
   wherein the method facilitates learning and communication by a remote site user with other remote site users and the training laboratory, said remote site user selecting one or more of the plurality of developmental segments in connection with play with the formed puppet which promotes right brain visual thinking, processing and communication, thus promoting brain development of the user.

2. The puppetry based communication method of claim 1 wherein said step of downloading includes printing said image on a printer.

3. The puppetry based communication method of claim 1 further comprising the step of
   manipulating said one or more images in the computer environment to create a personalized image.

4. A puppetry based communication business method for neurological development, comprising the steps of:
   providing a puppet site containing one or more images the one or more images being provided by content providers, and a training laboratory comprising a plurality of developmental segments having multimedia audio and video files containing content, the plurality of developmental segments comprising: Instructions on construction of the puppets, Communications, Show & Tell, Journal Writing, Curriculum Link, Problem-Solving, Storytelling, Children's Workshop, Adult Workshop, Staff Development, Evaluation, Research Associate, Special Project Partners and Special Education;
   configuring the one or more images to include a hinge area and being adapted for hand manipulation;
   subscribing one or more remote site users to said puppet site;
   the one or more remote site users accessing an interface and selecting one or more of the images;
   printing the selected one or more of the images in paper form;
   affixing a hinge to the paper form to allow the one or more remote site users to form the paper form to create a puppet representative of the one or more images; and
   the remote site user interacting with the puppet site having and the training laboratory,
   wherein the method facilitates learning and communication by the one or more remote site users with other remote site users and the training laboratory, said remote site user selecting one or more of the plurality of developmental segments in connection with play with the formed puppet which promotes right brain visual thinking, processing and communication, thus promoting brain development of the user.

5. The puppetry based business method of claim 4 wherein at least one of the images are provided by content providers.

6. The puppetry based business method of claim 4 wherein the one or more remote site users are selected from the group of: children, students, teachers, parents, employees, employers, patients, and any combination there of.

7. The puppetry based business method of claim 4 wherein the one or more remote site users are located at any one of a home, classroom, workshop, childcare center, business, hospital or training center.

8. The puppetry based business method of claim 4 further comprising the step of manipulating said one or more images to create a personalized image.

9. The puppetry based business method of claim 4 further comprising the step of organizing said one or more images into topic areas.

10. The puppetry based business method of claim 9 wherein said topic areas are selected from any one of the following: educational, training, medical, social awareness, business and entertainment.

11. A puppetry based communication system, comprising:
- a computer environment including a puppet site and a computer network, the puppet site containing a file server with databases for maintaining one or more images available in said puppet site and information regarding remote site users, and an on-line training laboratory having a plurality of developmental segments with multimedia audio and video files containing content, the plurality of developmental segments comprising: Instructions on construction of the puppets, Communications, Show & Tell, Journal Writing, Curriculum Link, Problem-Solving, Storytelling, Children's Workshop, Adult Workshop, Staff Development, Evaluation, Research Associate, Special Project Partners and Special Education, and being configured to provide instruction and interaction to the remote site users with other remote site users and the training laboratory when said remote site users selects one or more of the plurality of developmental segments in connection with play with the one or more images which promotes right brain visual thinking, processing and communication, thus promoting brain development of the user;
- at least one printer connected to said computer environment for printing said one or more images in paper form; and
- a hinge attached or integrated into said paper form, said hinge being adapted for hand manipulation to create a hand actuated puppet representative of said one or more images.

12. The puppetry based communication system of claim 11 wherein said hinge is formed within the image.

13. The puppetry based communication system of claim 11 wherein said hinge is affixed to the image.

14. The puppetry based communication system of claim 11 wherein the computer network is the Internet.

15. The puppetry based communication system of claim 11 further comprising an Internet server connected to the puppet site computer and the computer network.

16. A computer readable medium containing instructions which, when executed by a computer:
- provide one or more images;
- allow selection of said one or more images;
- enable a remote site user to print said one or more images in paper form; and
- allow interaction with an on-line training laboratory having a plurality of development segments with multimedia audio and video files containing content, the plurality of developmental segments comprising: Instructions on construction of the puppets, Communications, Show & Tell, Journal Writing, Curriculum Link, Problem-Solving, Storytelling, Children's Workshop, Adult Workshop, Staff Development, Evaluation, Research Associate, Special Project Partners and Special Education, said instructions when executed facilitate learning and communication by the one or more remote site users with other remote site users and the training laboratory, said remote site user selecting one or more of the plurality of developmental segments in connection with use of said one or more images in paper form to promote right brain visual thinking, processing and communication, thus promoting brain development of the users.

* * * * *